United States Patent
Jansz

(10) Patent No.: US 12,393,632 B2
(45) Date of Patent: Aug. 19, 2025

(54) DYNAMIC DETERMINATION OF DATA

(71) Applicant: COUPA SOFTWARE INCORPORATED, San Mateo, CA (US)

(72) Inventor: Kevin N. Jansz, Melbourne (AU)

(73) Assignee: Coupa Software Incorporated, Foster City, CA (US)

( * ) Notice: Subject to any disclaimer, the term of this patent is extended or adjusted under 35 U.S.C. 154(b) by 79 days.

(21) Appl. No.: 17/579,379

(22) Filed: Jan. 19, 2022

(65) Prior Publication Data

US 2023/0214424 A1  Jul. 6, 2023

Related U.S. Application Data

(60) Provisional application No. 63/295,556, filed on Dec. 31, 2021.

(51) Int. Cl.
| | |
|---|---|
| *G06F 16/901* | (2019.01) |
| *G06F 40/106* | (2020.01) |
| *G06F 40/169* | (2020.01) |
| *G06F 40/186* | (2020.01) |

(52) U.S. Cl.
CPC ........ *G06F 16/9024* (2019.01); *G06F 40/106* (2020.01); *G06F 40/169* (2020.01); *G06F 40/186* (2020.01)

(58) Field of Classification Search
None
See application file for complete search history.

(56) References Cited

U.S. PATENT DOCUMENTS

| | | | | |
|---|---|---|---|---|
| 6,873,992 | B1* | 3/2005 | Thomas | G06Q 10/10 707/E17.115 |
| 11,113,771 | B1* | 9/2021 | Wang | G06F 16/9024 |
| 2006/0010377 | A1* | 1/2006 | Anecki | G06Q 10/10 715/255 |

(Continued)

OTHER PUBLICATIONS

Microsoft, Inc. "Word add-ins overview", dated Apr. 27, 2023, URL <https://learn.microsoft.com/en-us/office/dev/add-ins/word/word-add-ins-programming-overview>, 4 pages.

(Continued)

*Primary Examiner* — Irene Baker
(74) *Attorney, Agent, or Firm* — Baker Botts L.L.P.

(57) ABSTRACT

The present disclosure provides for a method of automatically updating a digitally stored model of an electronic contract over the lifetime of a contract, including a step of receiving an update to an attribute of a digitally stored contract model. Further, retrieving, from a digital data store, model description data and a plurality of answer values. Based on the model description data and answer values, creating a graph of answer data and variables required in the electronic contract as nodes and edges, where nodes represent the answer data and variables, and edges represent dependencies of the nodes. Next, removing edges that are determined from first variables to second variables that the first variables had been declared as using. From the update to the attributes of the contract model, removing one or more nodes corresponding to the one or more variables that are not directly referenceable by the document.

20 Claims, 8 Drawing Sheets

(56) References Cited

U.S. PATENT DOCUMENTS

| | | | |
|---|---|---|---|
| 2006/0112114 A1* | 5/2006 | Yu | G06Q 40/10 |
| 2006/0287966 A1* | 12/2006 | Srinivasaraghavan | |
| | | | G06Q 10/10 |
| | | | 705/1.1 |
| 2008/0104504 A1* | 5/2008 | Gimson | G06F 40/186 |
| | | | 715/234 |
| 2010/0179962 A1* | 7/2010 | Schuster | G06F 40/174 |
| | | | 707/769 |
| 2010/0185862 A1* | 7/2010 | Moore | H04L 9/08 |
| | | | 713/171 |
| 2012/0131445 A1* | 5/2012 | Oyarzabal | G06F 40/103 |
| | | | 715/235 |
| 2012/0317149 A1* | 12/2012 | Jagota | G06F 16/9024 |
| | | | 707/E17.011 |
| 2014/0149839 A1* | 5/2014 | Bedard | G06F 40/18 |
| | | | 715/220 |
| 2016/0275627 A1* | 9/2016 | Wang | G06Q 40/123 |
| 2019/0042554 A1* | 2/2019 | Aylett | G06F 40/186 |
| 2020/0265049 A1* | 8/2020 | da Trindade | G06F 16/24545 |
| 2021/0248556 A1* | 8/2021 | Venkatraman | G06Q 10/103 |
| 2021/0294969 A1* | 9/2021 | Viswanathan | G06F 40/186 |
| 2021/0383247 A1* | 12/2021 | Brecque | G06F 40/16 |
| 2022/0366127 A1* | 11/2022 | Desh | G06Q 50/18 |

OTHER PUBLICATIONS github.com, "Query and manipulate JavaScript objects with JSONPath expressions. Robust JSONPath engine for Node.js.", retrieved Oct. 2, 2023, <https://github.com/dchester/jsonpath>, 7 pages.

* cited by examiner

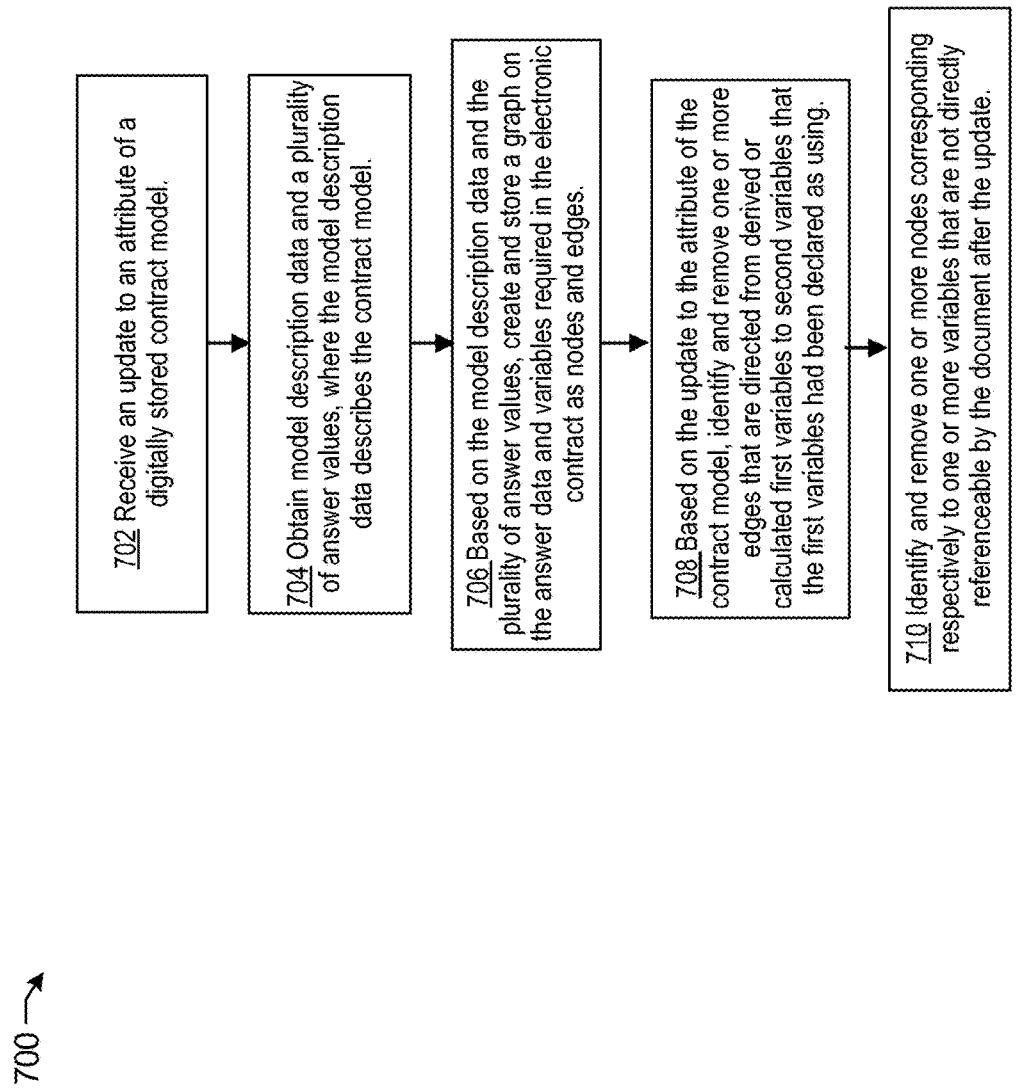

DYNAMIC DETERMINATION OF DATA

BENEFIT CLAIM

This application claims the benefit under 35 U.S.C. § 119 of provisional application 63/295,556, filed Dec. 31, 2021, the entire contents of which are hereby incorporated by reference as if fully set forth herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 20121 Coupa Software, Inc.

TECHNICAL FIELD

The present disclosure relates to computer software for automatically updating and tracking contract terms over the lifetime of a digitally stored contract. One technical field to which this disclosure relates is computer software for adding and editing metadata within electronic documents.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section, or that these developments are generally known to a person of ordinary skill in the art.

Parties use contracts to define their rights in relation to other contracting parties to a transaction or series of transactions. Modern business organizations have dozens, hundreds or even thousands of contracts in electronic digital computer storage that need to be monitored, approved, reviewed, performed, and updated. Contracts can be voluminous and may comprise large numbers of pages describing rights, obligations, relationships, restrictions, deadlines, and other fields. In some cases, parties may use a contract or document template during contract creation.

Using computer-based support tools implemented in software, the documents may be generated based on text, styles, and conditional logic defined in the templates. The end user may run an interactive "interview," which collects the data to initially build and populate fields in the contract. A digitally stored contract model, based on object-oriented programming or database techniques, can store specific values for a particular contract based on the template.

However, each field of the contract may be a point of negotiation within contracting parties to a transaction, and fields may need to be updated accordingly. Further, each updated field of a contract may need to be further populated in a manner that is consistent with other areas of the contract model. For example, the enforceable term of a contract could be negotiated from, for example, an initial value of twelve months to a revised value of eighteen months, with the term value being digitally stored in a database representation of the contract. If the contract term is extended, then the expiration date of the contract, which could be a different digitally stored value in the database, will need to be updated in accordance with the extended contract term. When this occurs, a link between the document template and the data input in accordance with the initial interview could be broken each time the document is edited.

Therefore, maintaining consistency among fields which are manually updated, and fields which were calculated based upon a template, in a digitally stored contract model, can be difficult. Keeping track of contract fields and updating corresponding fields during collaboration or negotiation between contracting parties has been, in some contexts, a vexing problem. In the past, contract evaluation has been accomplished by extracting and updating the data manually by humans, which is an expensive, time-consuming, and error-prone task. Therefore, there is a need in the art for a computer-implemented system for allowing contract parties to negotiate, view, and act upon changes to the contract document in a streamlined fashion while maintaining consistency and correctness in a data model of the contract.

SUMMARY

The appended claims may serve as a summary of the invention.

BRIEF DESCRIPTION OF THE DRAWINGS

FIG. 7 illustrates a computer-implemented method process according to an embodiment.

Figure 1:
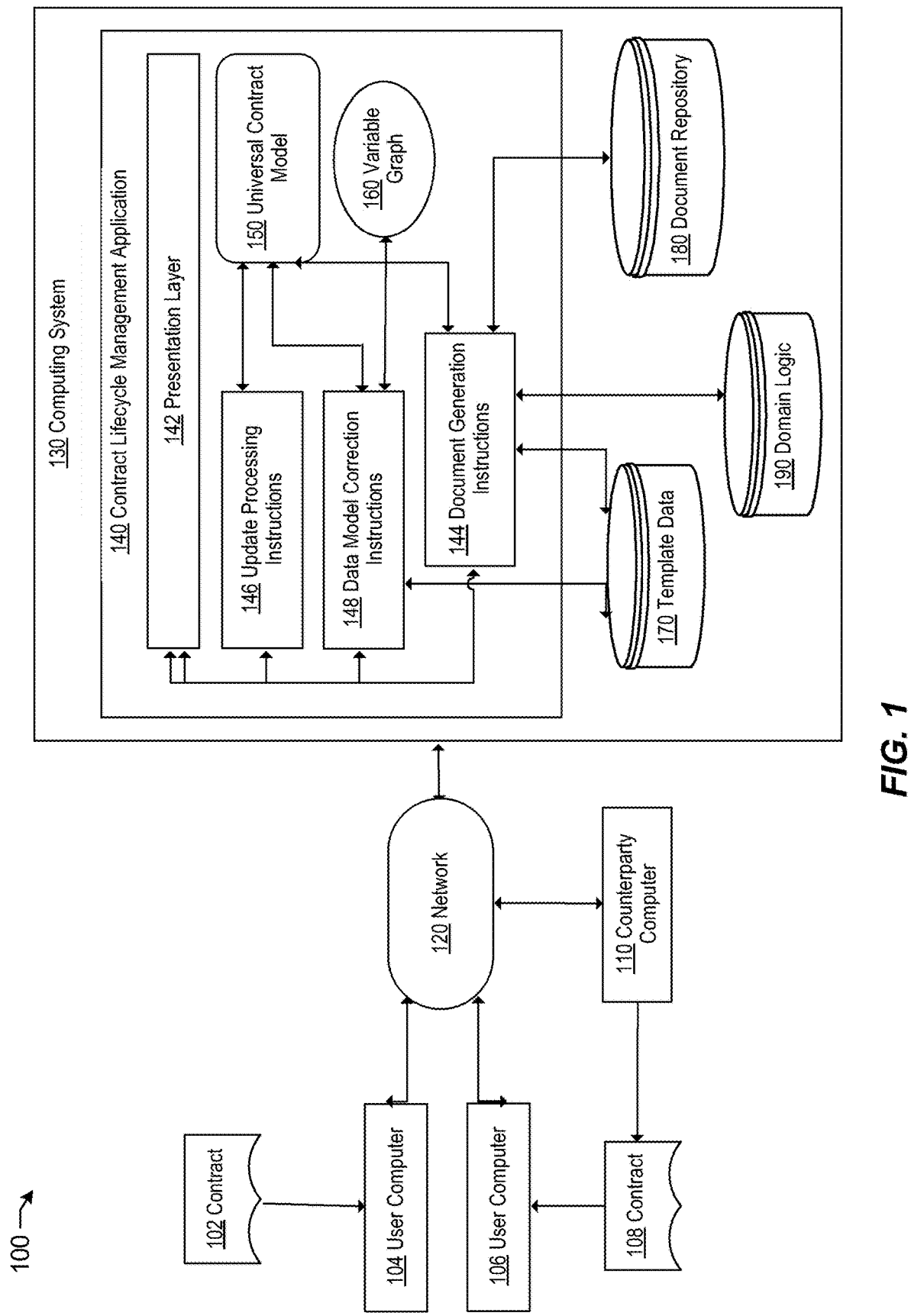
FIG. 1 illustrates one embodiment of a distributed computing system with which aspects of the present disclosure may be implemented.

While the present invention is amenable to various modifications and alternative forms, specific embodiments are shown by way of example in the drawings and are described in detail. However, the drawings and description are not intended to limit the invention to the forms disclosed, the intention is to cover all modifications, equivalents, and alternatives falling within the spirit and scope of the present invention s defined by the appended claims.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments are described in sections herein according to the following outline:

1. GENERAL OVERVIEW
2. STRUCTURAL AND FUNCTIONAL OVERVIEW
   2.1 EXAMPLE DISTRIBUTED SYSTEM
   2.2 EXAMPLE CONTRACT MODEL UPDATE PROCESS
   2.3 DATA TRANSFORMATION EXAMPLES
3. IMPLEMENTATION EXAMPLE—HARDWARE OVERVIEW

1. General Overview

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments execute in the context of distributed computer systems that manage large volumes of digitally stored contracts, represented in digital data storage using object-based contract models, backed by digital data repositories such as relational database systems, object databases, or flat file systems. A contract model can comprise nodes representing contract attributes or terms connected by edges that represent relationships of attributes or terms. The contract model, as a whole, constitutes metadata for a contract. A contract typically has a lifecycle beginning with drafting and/or finalization and signing, execution of obligations, ending in termination.

To solve the problem of keeping contract metadata updated throughout the lifecycle of the contract, the disclosure provides computer-implemented processes that are programmed to automatically update a digitally stored model of an electronic contract in response to changes in data values upon which the model is based. In an embodiment, a multi-tier contract object model represents contracts using object types that are connected via a series of rules. In an embodiment, object types include Contract Documents, Contract Transactions ("Contract Txns"), and Contract Objects.

Contract Documents contain things agreed upon by parties, including text content and optionally other forms of notation or expression such as tables, schedules, or appendices. The words in these contracts can then be linked to Contract Txns, which represent a set of terms in at least one Contract Document at a point in time and reflect a state-change to a contract. Contract Txns may reflect the time dimension of a contract, namely, there is at least one at the beginning, and there may be one or more others over time that change the original Contract Txn. In an embodiment, a finite set of Contract Txn types are defined, each of which has specified rollup rules, such that by evaluating all active Contract Txns, a computer-implemented process can determine and display or report on the prevailing terms of the contract at any point in time.

Each Contract Txn object has a child relationship to a Contract Object, which functions as a target of a rollup of the prevailing terms. Contract Objects allow an embodiment to rapidly access and present, to a user computer, the then-current terms of the contract at any point in time.

Using the data model of this disclosure, embodiments provide visibility into the contracting outcomes reflected in a party's contract portfolio. Embodiments can be used to protect the business of a party from dangerous contracts by providing users with information about how to improve future contract drafting and negotiation processes and outcomes. In one embodiment, the disclosure may allow parties to efficiently create high quality, low risk digitally stored contract documents through an intuitive interview-driven process. In one embodiment, one or more parties or counterparties may participate in a computer-implemented interview process. An embodiment can be programmed to generate documents at the end of the internal interview process that are used for further collaboration between parties, other internal stakeholders, and/or counterparties.

Embodiments can achieve significant reductions in the use of computing resources to manage metadata representing contracts, including reduced use of CPU cycles, storage, memory, and network bandwidth by reducing network messages required to reconcile changes in contract attribute values, and these technical benefits are reflected in the appended claims to a technical solution to the stated problem.

Embodiments can also provide secondary benefits such as reductions in costs, risks, and negotiating bottlenecks, although the appended claims are not intended to cover the achievement of secondary benefits. In one embodiment, for example, insights gained through contract portfolio analysis may be used to retrieve clauses from legacy contracts and automatically feed a clause library that is managed by machine. Clauses may be classified and ranked for favorability and risk attributes, and made available to users drafting new agreements, supported by a playbook of guidance.

Machine analysis of contractual outcomes can also be used to derive negotiation patterns, and to apply those patterns into templates and rule-sets for automated drafting. An example would be that analysis shows that all contracts of type A include a clause of type B. This inference is then used by the platform to propose a rule that all templates for new contracts of type A should include clause type B as a mandatory requirement. In one implementation, the template based drafting platform includes a set of drafting rules that are processed by assessing various input facts and using the template rules to generate a draft contract, without expert intervention, which includes clauses and attributes best suited to those facts.

In one embodiment, document generation software can create a reference document. The document generation software can create and store a master set of structured data that is associated with the reference document. In one embodiment, the master set of structured data may include data values with varying degrees of importance to the reference document. Although the reference document has been created by the document generation software, downstream versions of the reference documents are often created externally to the document generation software. In one embodiment, the downstream embodiments may be created and edited by many entities. For example, a copy of the reference document may be distributed to other computers or systems by email or uploaded to a cloud-based storage or file sharing service. An entity with access to the shared document may make one or more inputs or edits to one or more editable fields of the document using a text editing software such as a word processor. Although the one or more inputs may be made dynamically to the text of the document, the structured data associated with the reference document may remain static. This creates a mismatch between the structured data associated with the reference document and the unstructured inputs of the downstream version of the reference document.

Embodiments may be programmed to utilize a stored template to produce a mapping of text-based edits made in an edited document to structured data associated with a reference version of the edited document. In one embodiment, a computer-implemented process executes logic associated with the structured data via the stored template. In one embodiment, a document may be created by document generation software. A server computer may store a plurality of contract templates with one or more editable input fields for display or use by one or more client systems of one or more users. In one embodiment, the one or more editable input fields are updated in response to completion of the interview process. The term "answer data" may refer to the fields that are updated in response to completion of the interview process. In one embodiment, the document may include identifier properties at the document level that may link the document to the contract document, allowing for uploading new versions.

As input is received from a user computer to update one or more editable input fields of the contract template, the server computer may receive an update to one or more attributes or identifiers of a digitally stored contract. The digitally stored contract may retrieve model description data and the plurality of answer values, or values obtained from the interview process. In one embodiment, the model description data may describe the contract model. In one embodiment, based on the model description data and the plurality of answer values, a graph of the answer data may be generated. The graph answer data may be created and stored in the memory of one or more computers or cloud computing instances. In one embodiment, the graph of the answer data and variables that are required in the electronic contract may consist of nodes and edges, where nodes of the graph represent the answer data and edges of the graph represent derivations, calculations, or dependencies.

In one embodiment, based on the updates to attribute values of the contract model, a process can be programmed to identify and remove one or more edges that are directed from derived or calculated first variables to second variables that the first variables had been declared as using within the graph data representation. In one embodiment, based on the update to the attribute values of the contract model, one or more nodes, corresponding to one or more variables that are not directly referenceable by the document after the fields are updated, may be identified and removed from the graph data. To facilitate identifying and removing such nodes, all documents generated as a result of the interview process may have identifier properties that link the document to the contract model. As an example, identifier properties may include the instance name, a contract identifier ("ID") number, transaction name, document reference number, and/or version number. The size or the format of the identifiers, which may be stored as text in XML elements, can vary in different embodiments. In one embodiment, templates may be configured such that more than one contract is generated after the interview process is completed and contracts may be re-generated.

In one aspect of the disclosure, a computer-implemented method of automatically updating a digitally stored model of an electronic contract in response to changes in data values upon which the model is based comprises, using a server computer system, receiving an update to an attribute of a digitally stored contract model, the contract model having been created based on a digitally stored template, the template having one or more editable input fields capable of being rendered in a graphical user interface and having one or more automatically calculated fields, the template representing at least a portion of the electronic contract; obtaining, from digital data storage, model description data and a plurality of answer values, the model description data describing the contract model; based on the model description data and the plurality of answer values, creating and storing in computer memory a graph of the answer data and variables that are required in the electronic contract, nodes of the graph representing the answer data and the variables, edges of the graph representing derivations, calculations, or dependencies; based on the update to the attribute of the contract model, identifying and removing, from the graph data representation, one or more edges that are directed from derived or calculated first variables to second variables that the first variables had been declared as using; based on the update to the attribute of the contract model, identifying and removing, from the graph data representation, one or more nodes corresponding respectively to one or more variables that are not directly referenceable by the document after the update.

In one feature of this aspect, the method further comprises, during the identifying and removing, marking the edges that are removed as deflated.

In one feature of this aspect, the method further comprises, the answer values having been created based upon input received via an interactive interview.

In one feature of this aspect, the method further comprises, the template having one or more fields that are calculated automatically from the one or more editable fields.

In one feature of this aspect, the method further comprises, in response to identifying and removing the one or more nodes corresponding respectively to one or more variables that are not directly referenceable by the document after the update, flagging one or more areas of the data record with reset-answer flags to prompt the one or more areas of the data record to be re-asked in subsequent updates to the document.

In one feature of this aspect, the method further comprises, in response to identifying and removing, from the graph data representation, one or more edges that are directed from derived or calculated first variables to second variable that the first variables had been declared as using, generating a deflated-record flag indicating the one or more edges have been deflated.

In one feature of this aspect, the graph of answer data and variables that are required in the electric contract is a variable graph.

Other aspects of the disclosure, such as electronic devices and computer-readable storage media storing instructions that are configured to execute the methods just described, will become apparent from the disclosure as a whole.

2. Structural and Functional Overview 2.1 Example Distributed System

FIG. 1 illustrates one embodiment of a distributed computing system with which aspects of the present disclosure may be implemented.

In an embodiment, a distributed computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all of the description and claims in this disclosure, are intended to present, disclose and claim a technical system and technical methods in which specially programmed computers, using a special-purpose distributed computer system design, to execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In the example of FIG. 1, distributed computer system 100 comprises user computers 104, 106, a counterparty computer 110, network 120, and a computing system 130. User computers 104, 106 and counterparty computer may receive, transform, output, and interoperate with one or more contracts 102, 108, as further described herein in other sections. In one embodiment, contract 102 may be implemented as a master contract with full suite of transaction examples. As metadata is changed in contract 102, the changes give rise to a new contract. In one embodiment, the new contract may be a separate contract which reflects the updated fields. In one embodiment, the new contract which reflects the updated fields may be embodied as contract 108.

Each of the user computer 104, user computer 106, and counterparty computer 110 may comprise any of a desktop computer, laptop computer, tablet computer, mobile computing device, or virtual computing instance. Each of the user computer 104, user computer 106, and counterparty computer 110 may be programmed with computing infrastructure elements such as an operating system having system services that are capable of telecommunication with network 120 and the computing system 130, a browser, and one or more application programs.

Network 120 may be implemented on any medium or mechanism that provides for the exchange of data, signals, and/or instructions between computing system 130, contract 102, user computers 104, 106, contract 108, and counterparty computer 110. The network 120 can include one or more of a Local Area Network (LAN), a Wide Area Network (WAN), an Ethernet network or the Internet, or at least one terrestrial, satellite or wireless link, or a combination of any number of different networks and/or communication links.

In some embodiments, computing system 130 executes using one or more server-class computers, workstations, or virtual computing instances, in any of a private data center, public data center, or fee-based cloud computing facility. In one embodiment, computing system 130 is implemented as a set of federated cloud-based SaaS applications; user computers 104, 106 and counterparty computer 110 can connect to the computing system using a browser to interoperate with dynamically generated HTML presentation instructions that are locally rendered at the end-user computers.

In the example of FIG. 1, computing system 130 includes a Contract Lifecycle Management Application (CLMA) 140 comprising a presentation layer 142, update processing instructions 146, data model correction instructions 148, document generation instructions 144, a Universal Contract Model ("UCM") 150, and variable graph 160. Each of the presentation layer 142, update processing instructions 146, data model correction instructions 148, and document generation instructions 144 can be implemented using one or more computer programs, methods, functions, libraries, services, or other software elements, or integrated into a single program or application.

In an embodiment, Contract Lifecycle Management Application 140 contains several objects which have unique relationships to one another. In an embodiment, presentation layer 142 is programmed to manage presentation of output data relating to digitally represented contracts, and can include a web server, a graphics library, or other presentation tools. The update processing instructions 146 can be programmed to update an object model representing a contract in the manner described herein in other sections. The data model correction instructions 148 can be programmed to correct the object model of a contract in response to updates or changes, as further described. The document generation instructions 144 can be programmed to conduct an interactive interview and to generate contract documents from templates, related metadata, and related programmatic objects.

Presentation layer 142 may be in bidirectional digital communication with update processing instructions 146, data model correction instructions 148, document generation instructions 144, UCM 150, variable graph 160, template data 170, domain logic 190, and document repository 180. The Contract Lifecycle Management Application 140 may collect, store, and manage transactional data related to transactions between entities and counterparty entities, such as procurement transactions between buyer entities and supplier entities, or other related parties that are registered by Contract Lifecycle Management Application 140. In one embodiment, presentation layer 142 is a server-side web application framework that generates portions of a user interface and through which the Contract Lifecycle Management Application 140 and template data 170 may be made accessible to registered user computer's 104, 106 and counterparty computer(s) 110.

Update processing instructions 146 may be embodied as computer programming code stored in computer memory that when executed causes a computing device to automatically update processing instructions. In an embodiment, update processing instructions 146 may be embodied as software that automatically updates processing instructions when processing electronic agreements or contracts. In one embodiment, update processing instructions 146 may be communicatively coupled with UCM 150 and presentation layer 142. In one embodiment, in order to identify an update to processing instructions, update processing instructions 146 may measure a difference, or "delta," between a pair of text changes, such as text insertion and a proximate text deletion or between a text deletion and a proximate text insertion. Delta may indicate a number of characters that a text insertion and proximate text deletion may have in common, or the number of characters that a text insertion and proximate text deletion may not have in common. If delta satisfies a criterion, data model correction instructions 148 may be executed and needs further analysis.

Data model correction instructions 148 may be embodied as computer programming code stored in computer memory that when executed causes a computing device to automatically correct the data model with answer data. In one embodiment, data model correction instructions 148 may be embodied as software that automatically corrects the data model with answer data. In one embodiment, data model correction instructions may be bi-directionally communicatively coupled to update processing instructions 146, UCM 150, presentation layer 142, and variable graph 160.

Document generation instructions 144 may embodied as computer programming code stored in computer memory that when executed causes a computing device to automatically generate a digital document. In an embodiment, document generation instructions 144 are document generation software; that is, software that automatically generates documents such as electronic agreements or contracts. In one embodiment, document generation instructions 144 may be bi-directionally communicatively coupled to presentation layer 142, UCM 150, template data 170, domain logic 190, and document repository 180.

Universal Contract Model 150 represents a contract as data via a single contract object and relates that object to one or more contract documents. There may be master, stand-alone, sub-contract in other relationships that affect the question whether there is one contract or many. There is a time dimension where contracts change overtime, via amendments, assignments, renewals and other events and are very few constraints and rules about the way contracts are expressed, which makes it challenging to translate them into structured relationship relational data. With this model, virtually any type of contract may be represented in a way that supports accurate analysis of simple high-level terms, down the complex granular terms, without distortion or compromise.

In an embodiment, UCM 150 expresses contracts as actionable data and represents both what the contract is and what the contract says. In an embodiment, UCM 150 implements two logical parts. First, the UCM 150 is a structural representation of the events and artifacts through which contracts are created, changed and terminated. The UCM 150 starts with contract documents, which are the usual means for expressing new or amended contract terms. It includes the concept of contract transactions, which is an event by which a contract is changed in some way, and covers the execution of a new contract, an amendment, a worker purchase order, the change order, a renewal, and assignment, innovation, a termination or expiry, and a rescission. Collectively, all signed or active transactions roll up to a single contract object, which records a consolidated view of all those transactions. These three core objects are supplemented by additional objects, including legal entity, organizational, project and workflow objects, amongst others. Second, the contract data model is a data semantic representation of the parties, promises in meaning embodied in the terms of any contract. The data model organizes the data inside a contract into certain high level, universal categories, including the parties, the term and termination provisions, the payment and performance provisions, risk allocation provisions, relationship management provisions and other boilerplate terms.

Variable graph 160 may comprise a graph data structure in computer memory comprising nodes and edges, the edges representing relationships between the nodes. Variable graph 160 can be implemented using a graph database, with each phrase or other input of a contract being linked one-to-many times with applicable data attributes and linked to applicable contract objects. The variable graph 160 allows for highly accurate queries across large volumes of data with fine grained visibility, without the need for up-front modeling of relational database tables, which is particularly useful in the case of updating contract attributes.

In one embodiment, template data 170 may be a digital data store that stores template data. The term data store as used herein may refer to any implementation of a searchable data store, including but not limited to databases, graphs, trees, and XML (eXtensible Markup Language) files. Stored data of computing system 130 may reside on at least one persistent and/or volatile storage devices that may reside within the same local network 120 as at least one other device of computing system 130 and/or in a network 120 that is remote relative to at least one other device of computing system 130. Thus, although stored data of template data 170 is depicted as being in computing system 130, template data 170 may be part of computing system 130 or accessed by computing system 130 over a network, such as network 120.

Template data 170 may include digital templates that are used by document generation instructions 144 to automatically generate reference documents. In an embodiment, a digital template may contain domain logic that represents every foreseeable permutation of possible conditional outputs. A digital template may include, for example, a document identifier, a number of documents section identifiers, and for each document section identifier, a structured data identifier and or one or more logic identifiers and or one or more candidate edit identifiers. In one embodiment, an example document identifier may be a file name, transaction name, version number, document reference number, and/or contract ID number. In one embodiment, template data 170 may be implemented as a searchable database system, such as a graph-based database system, table-based relational database system, or a hierarchical system. Template data 170 may include numerous data records, where each data record may indicate, for example, and not by way of limitation, an entity name, a counterparty entity name, a transaction identifier and description, a transaction data, and contract information.

Computing system 130 may be embodied as computer programming code stored in computer memory that when executed, causes a computing device to enable bidirectional communication between template data 170, domain logic 190, document repository 180, and the Contract Lifecycle Management Application 140. Computing system 130 may provide document processing functionality, like the Contract Lifecycle Management Application 140. Computing system 130 may be implemented as a function call or library call using an application programming interface (API), or as in inter-process communication (IPC) interface. In one embodiment, it is understood that computing system 130 may be implemented within Contract Lifecycle Management Application 140 rather than as a separate component.

In one embodiment, document repository 180 may be a digital data store that stores reference documents and edited documents. Document repository 180 may store different versions of documents that are generated by a document generation software and document that have been edited using the Contract Lifecycle Management Application 140.

In one embodiment, domain logic 190 may be a digital data store that stores domain logic, or parameters that are used by a domain logic that is implemented in executable code of or called by document generation instructions 144. Examples of domain logic 190 may include rules and heuristics. In one embodiment, an item of domain logic 190 may be identified by a logic identifier. An item of domain logic 190 may be keyed to a document identifier and/or a document section identifier in a digital template. In one embodiment, domain logic 190 may be domain-specific. For example, in a Contract Lifecycle Management Application 140, domain logic 190 may include rules for handling edits to particular contract terms or clauses. In other embodiments, domain logic 190 may include rules for handling edits to particular document sections, such as rules for handling edits to the title, abstract, or conclusion of a document. Domain logic 190 may be pre-configured and stored independently of input data.

In one embodiment, when an edited document is ingested, update processing instructions 146 may call on data model correction instructions 148 to update the data model associated with the portion of template data 170 associated with the edit.

2.2 Example Contract Model Update Process

Figure 2:
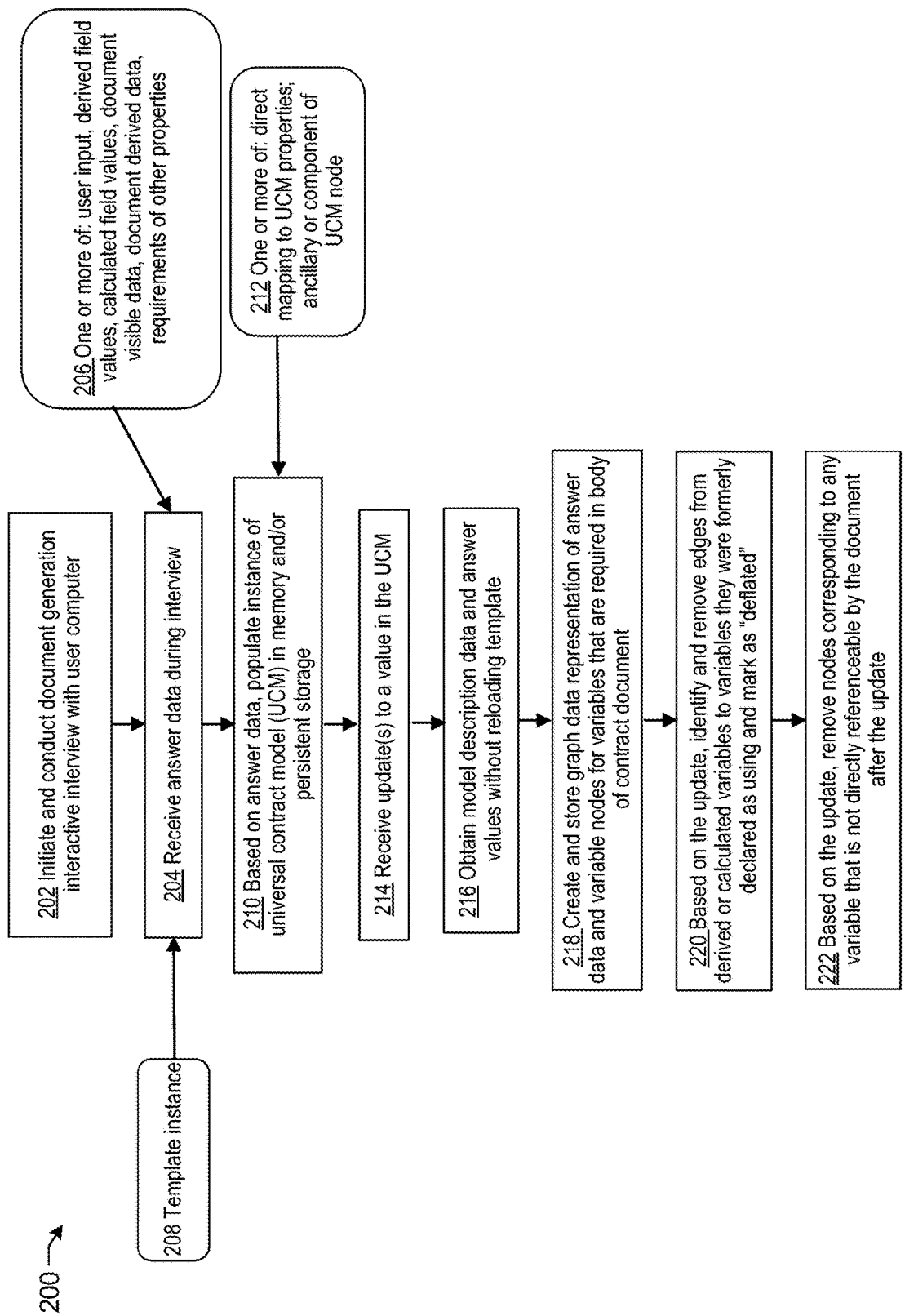
FIG. 2 is a flow diagram of a contract model graph transformation process that may be executed by at least one device of the computing system of FIG. 1.

FIG. 2 is a flow diagram of a contract model graph transformation process that may be executed by at least one device of the computing system of FIG. 1. FIG. 2 and each other flow diagram herein is intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs.

The operations of a flow 200 as shown in FIG. 2 may be executed using processor-executable instructions that are stored in computer memory. For purposes of providing a clear example, the operations of FIG. 2 are described as performed by computing system 130, but other embodiments may use other systems, devices, or implementation techniques.

In one embodiment, operation 202, when executed by at least one processor, causes one or more computing devices to initiate and conduct an interactive document generation interview with one or more user computers 104, 106.

In one embodiment, operation 204, when executed by at least one processor, causes one or more computing devices to receive answer data during the interview of operation 202. To do this, operation 204 may extract metadata as outlined in operation 206. The extracted data of operation 206 may include, for example, and not limited to, one or more of user input, derived field values, calculated field values, document visible data, document derived data, and requirements of other properties. In one embodiment, template instance metadata in operation 208 may be retrieved during the interview in operation 204.

In one embodiment, operation 210, when executed by at least one processor, causes one or more computing devices to populate instances of UCM 150 in the memory and/or persistent storage based on the answer data as received in operation 204. Operation 210 may perform one or more operations of 212 including direct mapping to UCM 150 properties, ancillary or component of the UCM 150 node. In one embodiment, operation 214, when executed by at least one processor, causes one or more computing devices to receive one or more updates to a value stored in UCM 150. In one embodiment, operation 216, when executed by at least one processor, causes one or more computing devices to obtain or retrieve model description data and answer values without reloading one or more templates.

In one embodiment, operation 218, when executed by at least one processor, causes one or more computing devices to create and store graph data representations of answer data and create and store variable nodes for variables that are required in the body of the contract document. In one embodiment, graph data representations of answer data and variable nodes may be stored in variable graph 160.

In one embodiment, operation 220, when executed by at least one processor, causes one or more computing devices to identify and remove edges from derived or calculated variables to variables they were formerly declared as using and mark the variables as "deflated" based on the updated values retrieved by UCM 150 in operation 214. In one embodiment, operation 222, when executed by at least one processor, causes one or more computing devices to remove nodes corresponding to any variable that is not directly referenceable by the document after the update received by the UCM 150 in operation 214.

In one embodiment, answer data provided by user computers 104, 106 may be a mix of user inputs and derived or calculated fields. In one embodiment, answer data provided by user computers 104, 106 may be a mix of data that is visible in the contract document and data obtained or derived but not in the body of the document. In one embodiment, answer data provided by user computers 104, 106 may be a mix of data that maps directly to UCM 150 properties and data that is ancillary of a component part of a UCM 150 data-point. In one embodiment, answer data provided by user computers 104, 106 may be a mix of data that has requirements of other properties and data that has no requirements.

Figure 3:
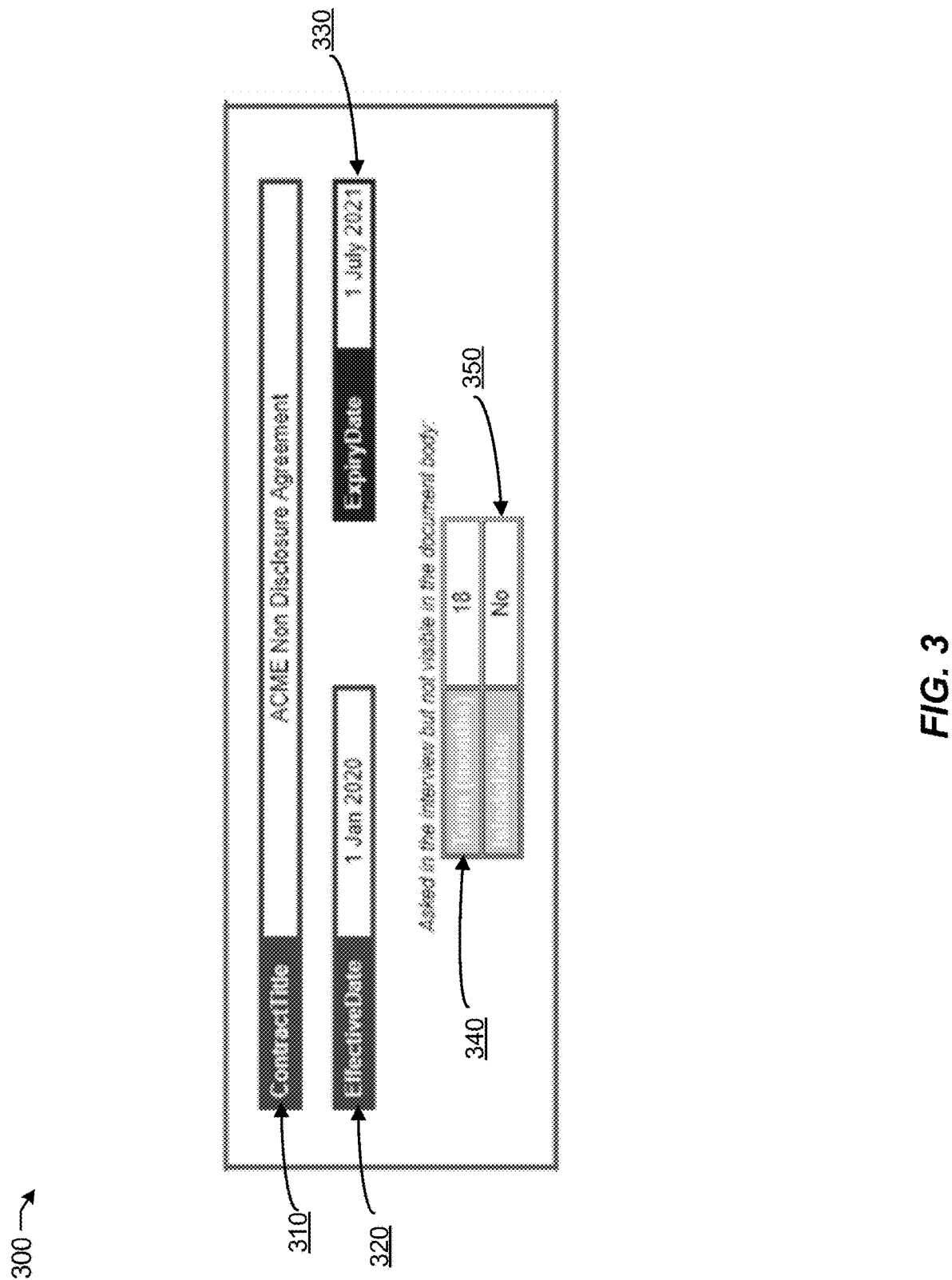
FIG. 3 demonstrates an example of a display on a computer display device that may be implemented in at least one embodiment of the computing system of FIG. 1.

FIG. 3 demonstrates an example of a display on a computer display device that may be implemented in at least one embodiment of the computing system 130 of FIG. 1. In one embodiment, a computer display device may comprise a graphical user interface having a window or frame specifying a five-variable template for certain aspects of a contract. In the example of FIG. 3, the window displays pairs of attribute labels and values for a contract title, effective date, expiration date, term, and indefinite term value.

In one embodiment, a ContractTitle field 310 may be determined by user input, mapped to UCM 150, and visible to a user in the document. In one embodiment, an EffectiveDate field 320 may be a field determined by user input, mapped to UCM 150, and visible to a user in the document. In one embodiment, an ExpiryDate field 330 may be a calculated field, mapped to UCM 150, and visible to a user in the document. In one embodiment, a Term field 340 may be a field determined by user input, not visible in the document, and mapped to UCM 150. In one embodiment, an IsIndefinite field 350 may be determined by user input, not visible in the document, and not mapped to UCM 150.

In one embodiment, for example, if a user inputs an update to ExpiryDate field 330, then the Term field 340 may not be invalid. However, not all document templates will be the same. In some cases, there may not be a Term field 340 that is editable or programmed for a user to input an answer, and the ExpiryDate field 330 may be a field to be manually edited by user input. In one embodiment, a process can be programmed to perform "inflate" functions to clean user input data, validate the user input data by running the data against the template, and automatically filling out any calculated data. In one embodiment, to facilitate a scenario where answer data creates a separation from template logic, a process can be programmed to perform "deflate" functions to prune metadata that is no longer compatible with a document template. The labels "inflate" and "deflate" are used for convenience as summary terms for more complex sets of underlying functional steps and are not required as labels or terms in all embodiments. TABLE 1 describes example elements required for managing the processing of existing stored answers.

TABLE 1

| PARAMETER | TYPE | DESCRIPTION |
| --- | --- | --- |
| describe | DescribeResponseWrapper | Object holding describing the template logic information. |
| updateRecord | Optional<AnswerRecord> | Record holding the data-points being added. |
| deleteRecord | Optional<AnswerRecord> | Record holding the data-points being removed. Variable names are the only information needed. |
| converter | Function<AnswerRecord, AnswerRecord> | Function that supply a replacement AnswerRecord based on the one provided. |

In one embodiment, the first element is a converter for managing the processing of existing stored answers. Next, In one embodiment, a process can be programmed to execute a "describe" payload, which may cover template logic information, where describe data may be cached in contracts. In one embodiment, a portion of template logic may not be "describable" due to dynamic loading of template fragments, such as when, for example, the present platform includes relationship information in new answer data.

Next, a process can be programmed to execute an optional step to update the record, referred to in this document as "answerRecord," where the record holding data-points to be added is updated. In one embodiment, a process can be programmed to execute a step referred to in this document as "deleteRecord," where record holding data-points to be removed are deleted, and only the answer keys, or variable names are retained.

TABLE 2 describes an implementation of deflate functionality that may be applied to variable answer data.

TABLE 2

CODE EXAMPLE OF "DEFLATE" FUNCTION

```
// get the input objects - describe; metaDataRecord to process; update
record with the changes
DescribeResponseWrapper describe =
DescribeResponseWrapper.createFromXml
(describeXml);
AnswerRecordWrapper metaDataRecord =
AnswerRecordWrapper.createFromXml
(fullMetaXml);
AnswerRecord update = AnswerRecordWrapper.createFromXml(diffXml).
getRecord( );
// this is the deflate processing call
metaDataRecord.covert(DeflateConverter.create(describe, Optional.of
(update), Optional.empty( )));
// this will be true
DeflateConverter.isDeflated(metaDataRecord.getRecord( ));
// this is the deflated XML
String deflatedXml = metaDataRecord.toXml( );
```

As demonstrated in Table 1, using variable relationship information retained from the answer data, a graph model may be created. In one embodiment, variable relationship information retained from the answer data may be modeled in variable graph 160. Further, a process can be programmed to add a virtual document node to represent variables that are required directly in the body of the document. For any derived or calculated variable that is being updated by new answer data, the previously derived or calculated carriable no longer requires the variables it was previously declared as using, and as such, those edges may be removed. It is understood that any node not directly able to be referenced by the document may be considered out of scope, and this variable may be pruned.

2.3 Data Transformation Examples

Figure 4:
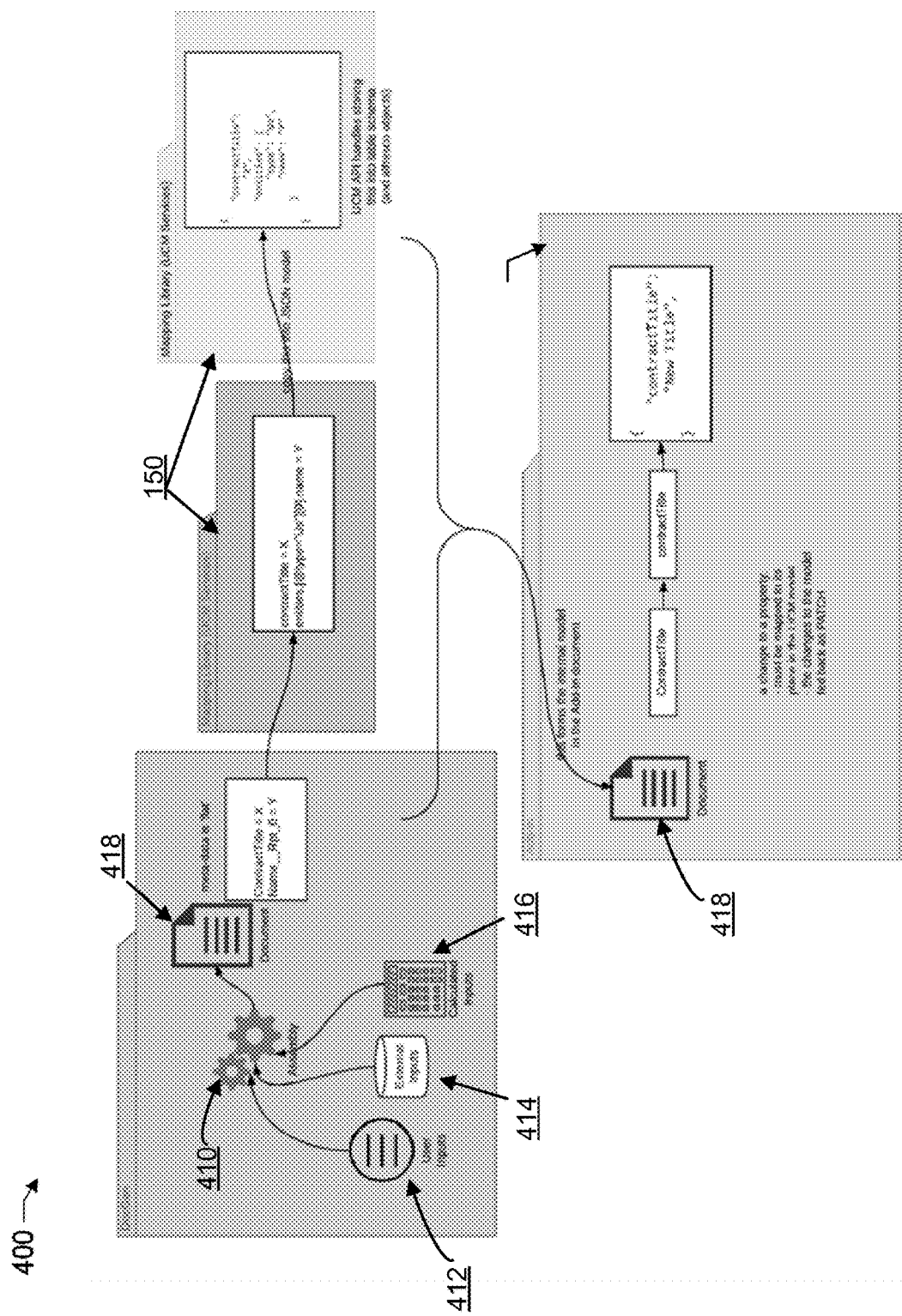
FIG. 4 illustrates example data transformation operations that may be performed using an embodiment.

FIG. 4 illustrates example data transformation operations that may be performed using an embodiment.

Reference numeral 400 denotes a plurality of data transformation operations and elements that can be used in one embodiment. In one embodiment, assembly code 410 can be programmed to receive metadata input by user inputs 412, external inputs 414, and/or calculated inputs 416. The term "assembly" is used, in this context, to refer to combining the specified inputs into a document and metadata, and not in the sense of low-level assembly language code. Assembly code 410 may output a combination of the user inputs 412, external inputs 414, and/or calculated inputs 416 to a document 418. In one embodiment, metadata can be inserted into document 418 as a set of flat properties consisting of key-value pairs, in which keys have key names that encode their value with structure that allows for repeatable properties.

In one embodiment, document 418 with flat metadata may be mapped to the UCM 150 library. The UCM 150 library may, for example, ask "what does variable ContractTitle" (field 310) map to in the UCM 150 API?" In one embodiment, the UCM 150 may copy document 418 metadata into a JSON model, where the UCM 150 API may handle storing the metadata into a table schema.

In one embodiment, after document 418 is copied into a JSON model, document 418 may be passed to an add-in module 430. In one embodiment, add-in module 430 may be in the form of a Word add-in. In one embodiment, add-in module 430 may be published and available to all users, customers, partners, and employees of the present platform. In one embodiment, add-in module 430 may authenticate a user computer or account via an authentication key or API key approach, although these specific security measures are not required in all embodiments.

In one embodiment, add-in module 430 may allow users to check the edited, or updated contract document back into the Contract Lifecycle Management Application 140 as their own draft, or the counterparty draft. In one embodiment, add-in module 430 may identify all changes to one or more editable fields or variable values and update the changes in the Contract Lifecycle Management Application 140. All changes may be validated for at least one or more of metadata type, conflicts in the case of multiple occurrences of the same variable, and dependencies to ensure the integrity of both the document and values updated after completing the upload. In one embodiment, any value that fails the above-mentioned checks by add-in module 430 may prompt a warning to the user on the add-in interface, so the user may be prompted to correct one or more sections of the document before uploading the document to the Contract Lifecycle Management Application 140.

Figure 5:
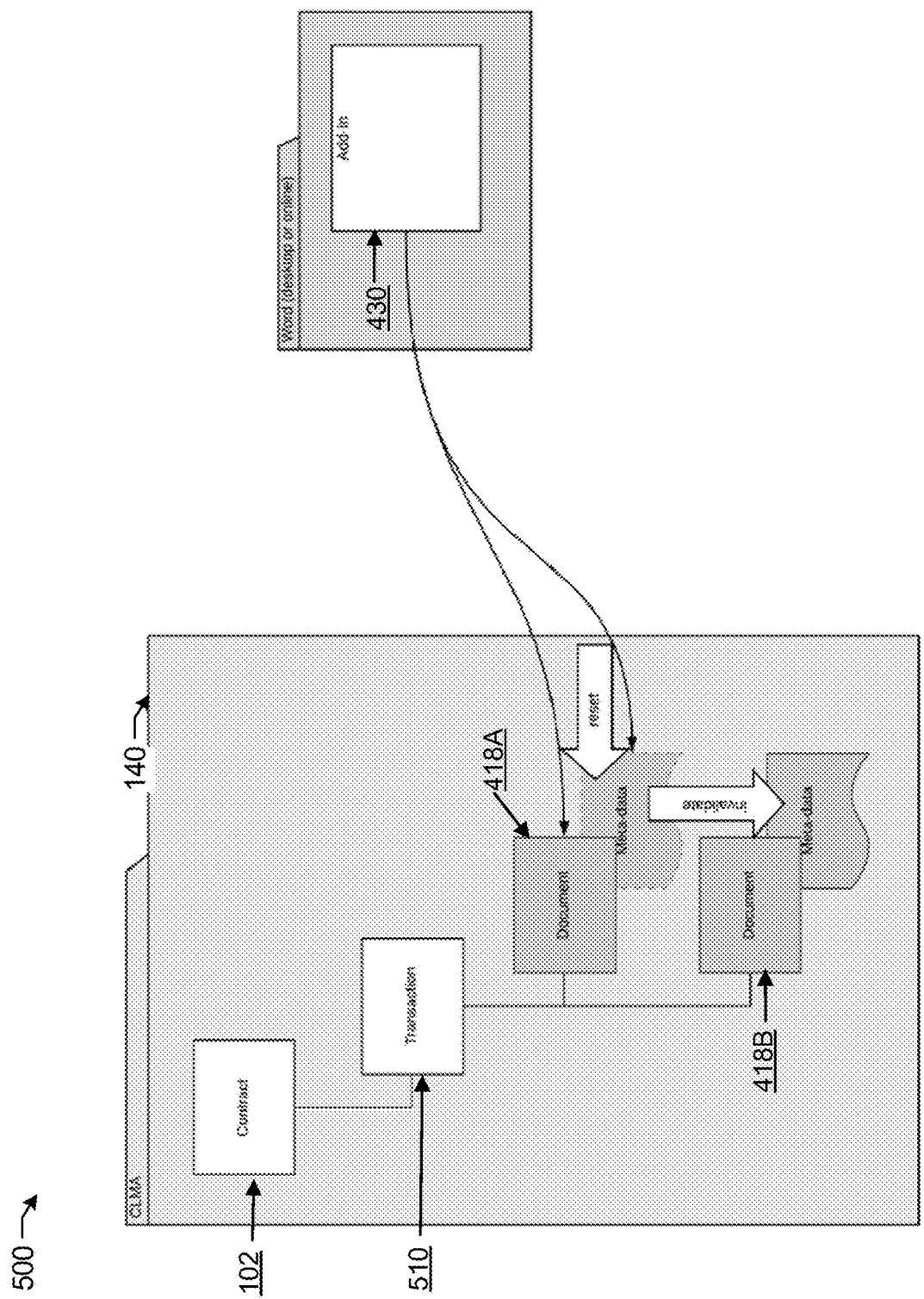
FIG. 5 illustrates other example data transfer operations that may be performed by a Contract Lifecycle Management Application (CLMA).

FIG. 5 illustrates other example data transfer operations that may be performed by a Contract Lifecycle Management Application. In one embodiment, Contract Lifecycle Management Application 140 may manage or access one or more contract(s) 102. Contract 102 may be input to transaction 510. In one embodiment, transaction 510 is an instance of a Contract Txns object, which represents a set of terms in at least contract 102, and is a child of the third object type, Contract Object, as previously discussed. Transaction 510 may output a first document 418A, in which one or more editable fields of contract 102 metadata may have been updated in add-in module 430. In one embodiment, a user may access Contract Lifecycle Management Application 140 through add-in module 430. Add-in module 430 may authenticate the user, and automatically be launched when a user opens a document with Contract Lifecycle Management Application 140 properties.

In one embodiment, updated metadata of contract 102 may be input to document 418A, in which the updated fields trigger one or more variables to be flagged as reset. It is understood that although metadata in document 418A may be flagged as reset, the metadata is not erased, but instead the new variable value may be reflected in document 418A, and input variables are reset at the time of storage.

In one embodiment, document 418B may be a subsequent document. In one embodiment, a process can be programmed to ensure that the input variables in document 418A are invalidated and re-asked of the user in document 418B. In one embodiment, a user may indicate the completion of updating one or more editable fields of document 418B and initiate a check-in process. The check in-process may verify that document 418B has met all pre-conditions, such as document 418B being checked out, that the current user is the one that checked document 418B out, that the current user has permissions to check document 418B back in, and that the version of document 418B matches the version currently checked out. When all pre-conditions are met, document 418B may be checked in and add-in module 430 may check document 418B within Contract Lifecycle Management Application 140.

In one embodiment, Contract Lifecycle Management Application 140 may provide the user with a check-in summary, summarizing the updates made by the user as part of the most recent document editing session. In one embodiment, add-in module 430 may display warning to the user to verify that all variables corresponding to updated values are accepted before updating UCM 150. In one embodiment, updates made to document 418B are updated directly to UCM 150 and not routed through the contract 102 template. In one embodiment, properties that correspond to data in UCM 150 will be updated. However, if there are conflicting values between document 418B and UCM 150, an error may be displayed to the user, prompting the user to correct instances where there are more than one instance in which a particular field has been updated, but the values are not updated across the entirety of the document. In one embodiment, the user may update all conflicting values manually before initiating the check-in procedure. In one embodiment, document that are presently checked out may be locked for editing by other users that may open the document. In one embodiment, Contract Lifecycle Management Application 140 may allow parallel reviews, but indicate and specify which users presently have the document checked out.

In one embodiment, Contract Lifecycle Management Application 140 may indicate the status of contract 102 throughout the lifecycle, an indicate expected next actions. For example, when there are review or approval tasks generated on contract 102, the Contract Lifecycle Management Application 140 may change the status of contract 102 to "Internal Review." In one embodiment, Contract Lifecycle Management Application 140 may indicate the status of contract 102 as "Internal Review Complete" when all review tasks are completed. In one embodiment, Contract Lifecycle Management Application 140 may indicate the status of contract 102 as "Negotiation with Counterparty" when a contract manager checks out the document as "Send to Counterparty" or "Email Externally." In one embodiment, Contract Lifecycle Management Application 140 may indicate the status of contract 102 as "Negotiation with Us" when a contract manager checks contract 102 back in through add-in module 430.

Figure 6B:
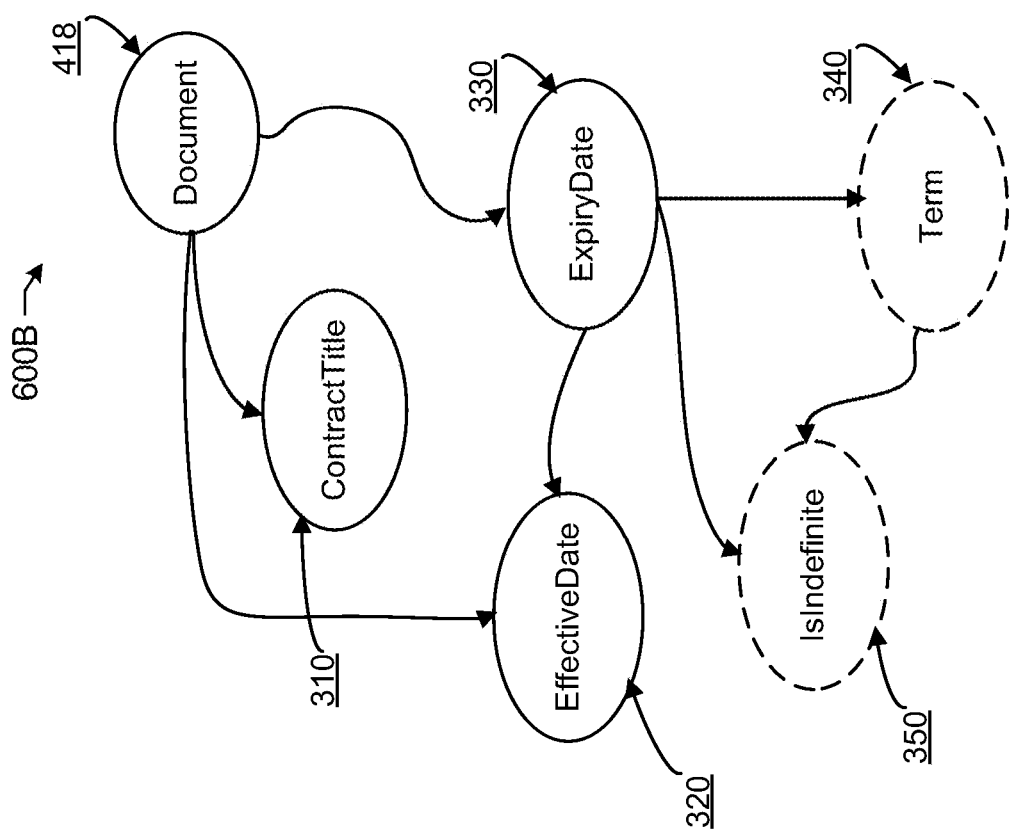
FIG. 6A, FIG. 6B illustrate different states of a graph data model of a contract during transformation according to an embodiment.
Figure 6A:
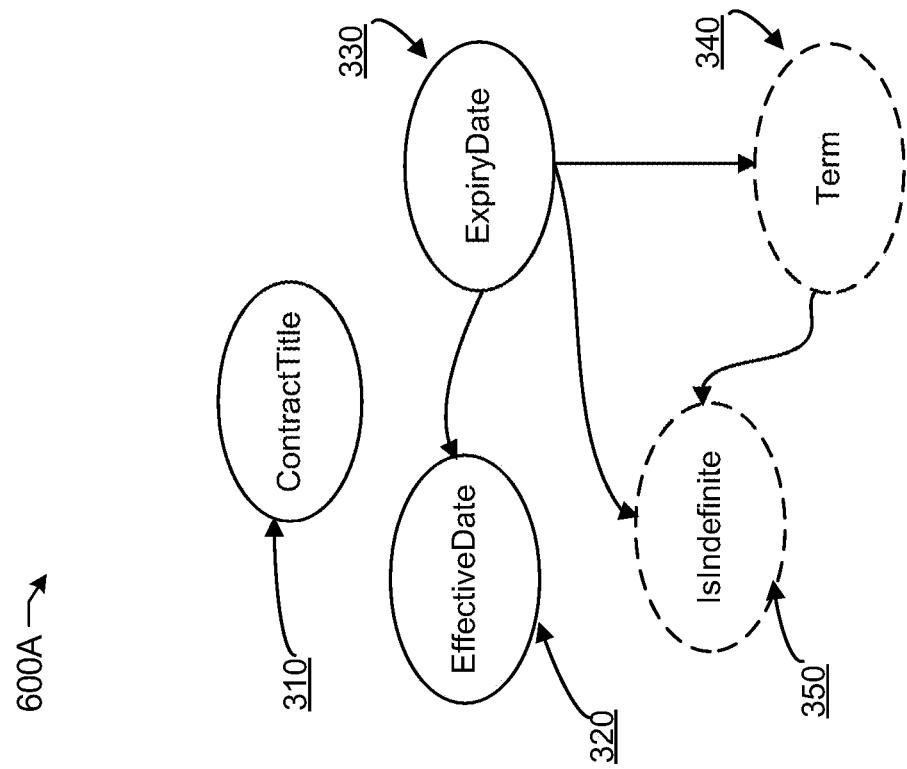

FIG. 6A, FIG. 6B illustrate different states of a graph data model of a contract during transformation according to an embodiment.

Referring first to FIG. 6A, in a first graph 600A, the ContractTitle field 310 (FIG. 3) may be represented using a virtual document node to represent variables required directly in the body of the document, such as the title of the contract. In the example of FIG. 6A, ContractTitle field 310 does not have any dependencies on or from the node. A node for EffectiveDate field 320 of graph 600A may depend from a node for ExpiryDate field 330. In one embodiment, a node for the value of the IsIndefinite field 350 may be a derived or calculated variable from ExpiryDate field 330 with a relationship to that node and can have a dependency relationship to a node for Term field 340. Similarly, the node for Term field 340 may be a derived or calculated variable of ExpiryDate field 330 with a dependency relationship to that node. In one embodiment, nodes for IsIndefinite field 350 and Term field 340 may be flagged as "reset" or "deflated" so that if applied to another document generation process, a user computer 102 may be re-asked for values for those fields, using a prompt dialog that presents the previous value to the user computer 102. Other embodiments may use labels other than "reset" or "deflated", and mechanisms other than flag values, to accomplish equivalent functions. The use of flag values is described further herein in connection with TABLE 3.

Referring now to FIG. 6B, in a second graph 600B, a node for ContractTitle field 310 may depend from document 418. ContractTitle field 310 may be a virtual document node to represent variables required directly in the body of the document, such as the title of the contract. As demonstrated by graph 600B, EffectiveDate field 320 of graph 600A may depend from ExpiryDate field 330 and document 418. In one embodiment, EffectiveDate field 320 may be flagged as "reset" so that if applied to another document, the EffectiveDate field 320 may be re-asked so one or more subsequent users may re-input data and view the previous value. In graph 600B, ExpiryDate field 330 may depend on document 418 and generate dependencies to IsIndefinite350 and Term field 340. It is understood that IsIndefinite field 350 and Term field 340 may be similarly flagged as reset. TABLE 3 demonstrates a deflated-record flag in the SourceInfo element to indicate it has been deflated. In one embodiment, response elements may include the reset-answer flag to indicate the one or more fields should be re-evaluated if used again.

TABLE 3

```
<AnswerRecord xmlns="http://speedlegal.com/common/xml">
  <SourceInfo>
    <Fields>
      <Field name="deflated-record">true</Field>
    </Fields>
  </SourceInfo>
  ...
```

TABLE 4 demonstrates the reset-answer flag to indicate one or more portions of the data-record to indicate those sections of the data record should be re-asked and re-evaluated if one or more subsequent user's uses the document again.

TABLE 4

```
<Response derived="true" used="true" numericValue="120">
    <Variable name="TermInitialMonths" dataType="
nonNegativeInteger">
        <Fields>
            <Field name="AlfrescoMetadata" runtime="
false">InitialTermMonths</Field>
            <Field name="alwayssave" runtime="false"
>true</Field>
            <Field name="dontload" runtime="false"
>true</Field>
            <Field name="reset-answer" runtime="true"
>true</Field>
        </Fields>
        <RelationshipContext>
            <Requires name="
TermInitialMonths_OtherMonths_NOT"/>
            <Requires name="TermInitialMonths.
OtherMonths"/>
            <Requires name="TermInitial_HasExpiryDate"
type="template"/>
            <Requires name="TermInitialMonths_MCQ"
type="logic"/>
            <Requires name="TermInitialMonthsOther"
type="logic"/>
        </RelationshipContext>
    </Variable>
    <Answer>120</Answer>
</Response>
```

In one embodiment, any answer record manipulation my clear the SourceInfo in the resulting answer record due to being a new record, so any answer from previous records will be invalidated. In one embodiment, for code using the "AnswerRecordWrapper" of Table 2, where it is known that one or more of the records may be deflated, a "source info blend policy" called "MaintainDeflatedSourceInfoBlendPolicy" may be implemented to ensure the deflated flag persists in all subsequent updates to the data record, as demonstrated in TABLE 5.

TABLE 5

```
AnswerRecordWrapper baseRecord =
AnswerRecordWrapper.createFromXml
(originalXml);
AnswerRecordWrapper deflatedRecord =
AnswerRecordWrapper.createFromXml
(deflatedXml);
// this will be false
DeflateConverter.isDeflated(baseRecord.getRecord( ));
// this will be true
DeflateConverter.isDeflated(deflatedRecord.getRecord( ));
// see Contracts:
com.exari.metadata.MetadataHelper.getDeltaXML(String,
String)
Predicate<Response> deltaFilter = FieldNameFilter.exclude("dontcopy");
deflatedRecord.setEquivalencePolicy(new FieldsEquivalencePolicy
(AnswerRecordWrapper.RUNTIME_FIELD_FILTER));
deflatedRecord.setSourceInfoBlendPolicy
(MaintainDeflatedSourceInfoBlendPolicy.create( ));
AnswerRecordWrapper delta = deflatedRecord
    .difference(base.getRecord( ))
    .filter(deltaFilter);
// this will be true
DeflateConverter.isDeflated(delta.getRecord( ));
```

FIG. 7 illustrates a computer-implemented method process according to an embodiment. In an embodiment, a process 700 can be programmed for automatically updating a digitally stored model of an electronic contract in response to changes in data values upon which the model is based. In some embodiments, the Contract Lifecycle Management Application 140 (FIG. 1) can be programmed to execute the process 700.

In one embodiment, operation 702 involves, using a server computer system, receiving an update to an attribute of a digitally stored contract model, where the contract model has been created based on a digitally stored template. The template may have one or more editable input fields capable of being rendered in a graphical user interface and have one or more automatically calculated fields. In one embodiment, the template may represent at least a portion of the electronic contract.

Operation 704 may involve obtaining, from a digital data store, model description data and a plurality of answer values. In one embodiment, the model description data may describe the contract model.

In one embodiment, in operation 706, based on the model description data and the plurality of answer values, the computer-implemented method of 700 may create and store, in computer memory, a graph of the answer data and variables required in the electronic contract. In one embodiment, nodes of the graph may represent the answer data and variables, and edges of the graph may represent derivations, calculations, and/or dependencies.

In one embodiment, operation 708 may, based on the update to the attribute of the contract model, identify and remove one or more edges that are directed from derived or calculated first variables, to second variables that the first variables had been declared as using in the graph data representation.

In one embodiment, operation 710 may, based on the update to the attribute of the contract model, identifying and remove, from the graph data representation, one or more nodes corresponding respectively to one or more variables that are not directly referenceable by the document after the update.

3. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 8:
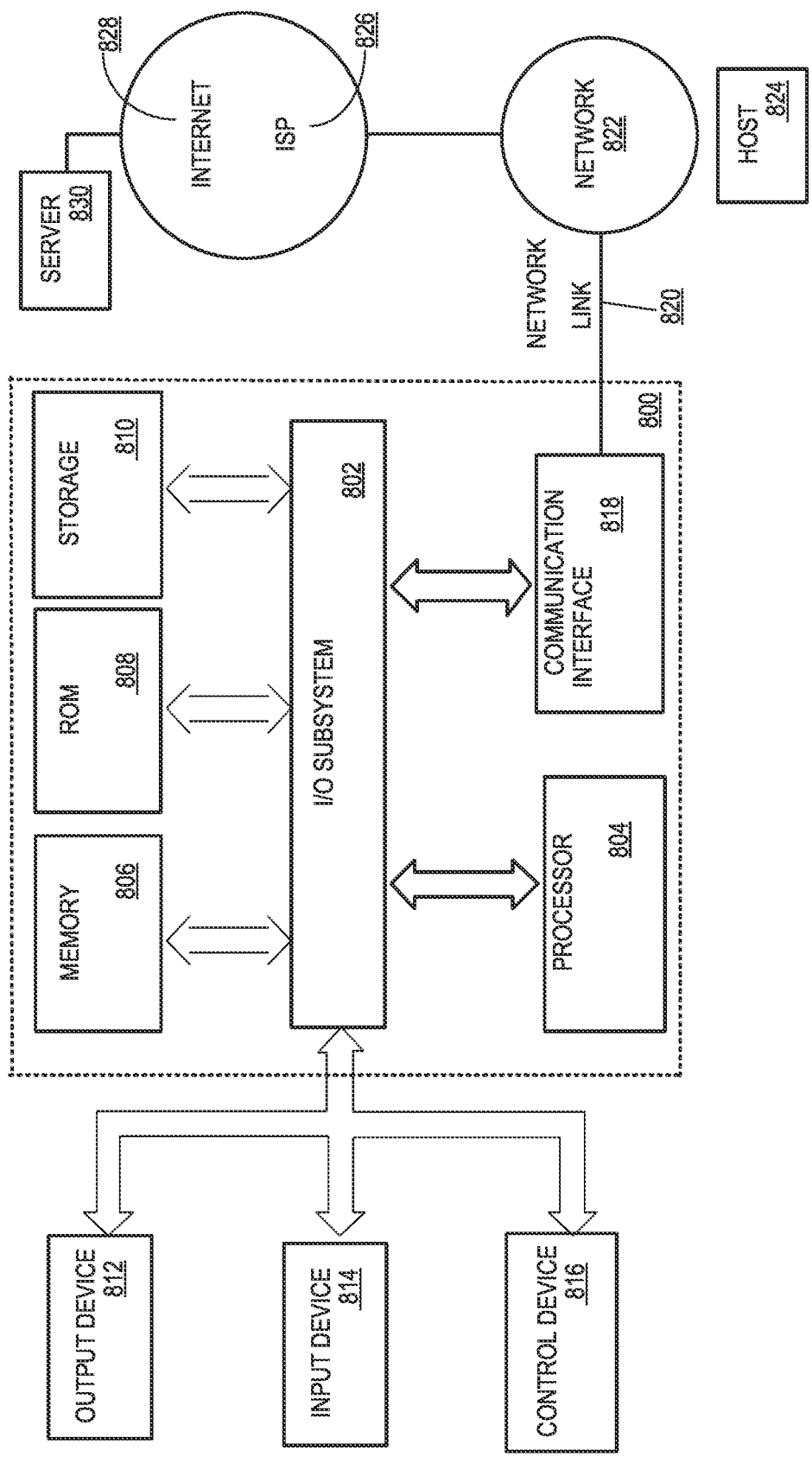
FIG. 8 illustrates a computer system with which one embodiment could be implemented.

FIG. 8 is a block diagram that illustrates an example computer system with which an embodiment may be implemented. In the example of FIG. 8, a computer system 800 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 800 includes an input/output (I/O) subsystem 802 which may include a bus and/or other communication mechanism(s) for communicating information and/or instructions between the components of the computer system 800 over electronic signal paths. The I/O subsystem 802 may include an I/O controller, a memory controller and at least one I/O port. The electronic signal paths are represented schematically in the drawings, for example as lines, unidirectional arrows, or bidirectional arrows.

At least one hardware processor 804 is coupled to I/O subsystem 802 for processing information and instructions. Hardware processor 804 may include, for example, a general-purpose microprocessor or microcontroller and/or a special-purpose microprocessor such as an embedded system or a graphics processing unit (GPU) or a digital signal processor or ARM processor. Processor 804 may comprise an integrated arithmetic logic unit (ALU) or may be coupled to a separate ALU.

Computer system 800 includes one or more units of memory 806, such as a main memory, which is coupled to I/O subsystem 802 for electronically digitally storing data and instructions to be executed by processor 804. Memory 806 may include volatile memory such as various forms of random-access memory (RAM) or other dynamic storage device. Memory 806 also may be used for storing temporary variables or other intermediate information during execution of instructions to be executed by processor 804. Such instructions, when stored in non-transitory computer-readable storage media accessible to processor 804, can render computer system 800 into a special-purpose machine that is customized to perform the operations specified in the instructions.

Computer system 800 further includes non-volatile memory such as read only memory (ROM) 808 or other static storage device coupled to I/O subsystem 802 for storing information and instructions for processor 804. The ROM 808 may include various forms of programmable ROM (PROM) such as erasable PROM (EPROM) or electrically erasable PROM (EEPROM). A unit of persistent storage 810 may include various forms of non-volatile RAM (NVRAM), such as FLASH memory, or solid-state storage, magnetic disk or optical disk such as CD-ROM or DVD-ROM and may be coupled to I/O subsystem 802 for storing information and instructions. Storage 810 is an example of a non-transitory computer-readable medium that may be used to store instructions and data which when executed by the processor 804 cause performing computer-implemented methods to execute the techniques herein.

The instructions in memory 806, ROM 808 or storage 810 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 800 may be coupled via I/O subsystem 802 to at least one output device 812. In one embodiment, output device 812 is a digital computer display. Examples of a display that may be used in various embodiments include a touch screen display or a light-emitting diode (LED) display or a liquid crystal display (LCD) or an e-paper display. Computer system 800 may include other type(s) of output devices 812, alternatively or in addition to a display device. Examples of other output devices 812 include printers, ticket printers, plotters, projectors, sound cards or video cards, speakers, buzzers or piezoelectric devices or other audible devices, lamps or LED or LCD indicators, haptic devices, actuators or servos.

At least one input device 814 is coupled to I/O subsystem 802 for communicating signals, data, command selections or gestures to processor 804. Examples of input devices 814 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 816, which may perform cursor control or other automated control functions such as navigation in a graphical interface on a display screen, alternatively or in addition to input functions. Control device 816 may be a touchpad, a mouse, a trackball, or cursor direction keys for communicating direction information and command selections to processor 804 and for controlling cursor movement on an output device 812 such as a display. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 814 may include a combination of multiple different input devices, such as a video camera and a depth sensor.

In another embodiment, computer system 800 may comprise an internet of things (IoT) device in which one or more of the output device 812, input device 814, and control device 816 are omitted. Or, in such an embodiment, the input device 814 may comprise one or more cameras, motion detectors, thermometers, microphones, seismic detectors, other sensors or detectors, measurement devices or encoders and the output device 812 may comprise a special-purpose display such as a single-line LED or LCD display, one or more indicators, a display panel, a meter, a valve, a solenoid, an actuator or a servo.

When computer system 800 is a mobile computing device, input device 814 may comprise a global positioning system (GPS) receiver coupled to a GPS module that is capable of triangulating to a plurality of GPS satellites, determining and generating geo-location or position data such as latitude-longitude values for a geophysical location of the computer system 800. Output device 812 may include hardware, software, firmware and interfaces for generating position reporting packets, notifications, pulse or heartbeat signals, or other recurring data transmissions that specify a position of the computer system 800, alone or in combination with other application-specific data, directed toward host computer 824 or server 830.

Computer system 800 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 800 in response to processor 804 executing at least one sequence of at least one instruction contained in main memory 806. Such instructions may be read into main memory 806 from another storage medium, such as storage 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 810. Volatile media includes dynamic memory, such as memory 806. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 802. Transmission media can also take the form of acoustic or light waves, such as those generated during radio-wave and infra-red data communications.

Various forms of media may be involved in carrying at least one sequence of at least one instruction to processor 804 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 800 can receive the data on the communication link and convert the data to a format that can be read by computer system 800. For instance, a receiver such as a radio frequency antenna or an infrared detector can receive the data carried in a wireless or optical signal and appropriate circuitry can provide the data to I/O subsystem 802 such as place the data on a bus. I/O subsystem 802 carries the data to memory 806, from which processor 804 retrieves and executes the instructions. The instructions received by memory 806 may optionally be stored on storage 810 either before or after execution by processor 804.

Computer system 800 also includes a communication interface 818 coupled to I/O subsystem 802. Communication interface 818 provides a two-way data communication coupling to network link(s) 820 that are directly or indirectly connected to at least one communication networks, such as a network 822 or a public or private cloud on the Internet. For example, communication interface 818 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 822 broadly represents a local area network (LAN), wide-area network (WAN), campus network, internetwork or any combination thereof. Communication interface 818 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 818 sends and receives electrical, electromagnetic or optical signals over signal paths that carry digital data streams representing various types of information.

Network link 820 typically provides electrical, electromagnetic, or optical data communication directly or through at least one network to other data devices, using, for example, satellite, cellular, Wi-Fi, or BLUETOOTH technology. For example, network link 820 may provide a connection through a network 822 to a host computer 824.

Furthermore, network link 820 may provide a connection through network 822 or to other computing devices via internetworking devices and/or computers that are operated by an Internet Service Provider (ISP) 526. ISP 826 provides data communication services through a world-wide packet data communication network represented as internet 828. A server 830 may be coupled to internet 828. Server 830 broadly represents any computer, data center, virtual machine or virtual computing instance with or without a hypervisor, or computer executing a containerized program system such as DOCKER or KUBERNETES. Server 830 may represent an electronic digital service that is implemented using more than one computer or instance and that is accessed and used by transmitting web services requests, uniform resource locator (URL) strings with parameters in HTTP payloads, API calls, app services calls, or other service calls. Computer system 800 and server 830 may form elements of a distributed computing system that includes other computers, a processing cluster, server farm or other organization of computers that cooperate to perform tasks or execute applications or services. Server 830 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 830 may comprise a web application server that hosts a presentation layer, application layer and data storage layer such as a relational database system using structured query language (SQL) or no SQL, an object store, a graph database, a flat file system or other data storage.

Computer system 800 can send messages and receive data and instructions, including program code, through the network(s), network link 820 and communication interface 818. In the Internet example, a server 830 might transmit a requested code for an application program through Internet 828, ISP 826, local network 822 and communication interface 818. The received code may be executed by processor 804 as it is received, and/or stored in storage 810, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 804. While each processor 804 or core of the processor executes a single task at a time, computer system 800 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method of automatically updating an object-based digitally stored contract model of an electronic contract in response to changes in data values upon which the contract model is based and connected to other electronic contracts via a series of rules, the method comprising:

using a server computer system, during a document editing session receiving an update to an attribute of the digitally stored contract model, the contract model having been created based on a digitally stored template that includes a drafting platform with a set of drafting rules and object-oriented programming, wherein the contract model is a data semantic representation of terms of the electronic contract including parties, term, termination provisions, payment and performance provisions, and risk allocation provisions, wherein the contract model includes contract metadata and represents the contract as data via a single contract object related to one or more contract documents, wherein a contract document includes identifier properties, text content, tables, schedules or appendices and the template has a document identifier, a number of documents section identifiers, a structured data identifier and or one or more logic identifiers and or one or more candidate edit identifiers, one or more editable input fields capable of being rendered in a graphical user interface and one or more automatically calculated fields, the template representing at least a portion of the electronic contract;

obtaining, from a digital data storage, model description data and a plurality of answer values, the model description data describing the contract model;

based on the model description data and the plurality of answer values, creating and storing in computer memory a graph including a graph data representation of the plurality of answer values and variables that are required in a body of the contract document, wherein nodes of the graph represent the plurality of answer values and the variables, and edges of the graph represent derivations, calculations, or dependencies;

based on the update to the attribute of the contract model, identifying and removing, from the graph data representation, one or more edges that are directed from derived or calculated first variables to second variables that the first variables had been declared as using;

based on the update to the attribute of the contract model, identifying and removing, from the graph data representation, one or more nodes corresponding respectively to one or more variables that are not directly referenceable by the contract document after the update to automatically update the digitally stored contract model of the electronic contract, wherein the contract metadata is updated corresponding to the removing of the one or more edges and the one or more nodes, wherein the updated contract metadata is copied into a JavaScript Object Notation (JSON) model;

performing a check-in process that verifies one or more pre-conditions associated with the electronic contract;

providing a summary of the update of the digitally stored contract model from the document editing session;

updating a status of the electronic contract throughout a lifecycle of the electronic contract, wherein one or more prevailing contract terms of the electronic contract are tracked and displayed during the lifecycle.

2. The method of claim 1, further comprising, during the identifying and removing, marking the edges that are removed as deflated.

3. The method of claim 1, the plurality of answer values having been created based upon an input received via an interactive interview.

4. The method of claim 1, the template having the one or more automatically calculated fields that are calculated automatically from the one or more editable input fields.

5. The method of claim 4, further comprising, in response to identifying and removing the one or more nodes corresponding respectively to the one or more variables that are not directly referenceable by the contract document after the update, flagging one or more areas of a data record with reset-answer flags to prompt the one or more areas of the data record to be re-asked in subsequent updates to the contract document.

6. The method of claim 1, further comprising, in response to identifying and removing, from the graph data representation, the one or more edges that are directed from the derived or calculated first variables to the second variables that the first variables had been declared as using, generating a deflated-record flag indicating the one or more edges have been deflated.

7. The method of claim 1, the graph data representation of the plurality of answer values and variables that are required in the electronic contract comprising one or more phrases of the electronic contract linked one-to-many times with the attributes and contract objects.

8. An electronic device for automatically updating an object-based digitally stored multi-tier contract model of an electronic contract in response to changes in data values upon which the model is based and connected to other electronic contracts via a series of rules, the electronic device comprising:

one or more processors;

one or more output devices that are communicatively coupled to the one or more processors;

one or more non-transitory computer-readable storage media that are communicatively coupled to the one or more processors and storing one or more sequences of stored program instructions which, when executed using the one or more processors, cause the one or more processors to execute:

receiving an update to an attribute of the digitally stored contract model, the contract model having been created based on a digitally stored template that includes a drafting platform with a set of drafting rules and object-oriented programming, wherein the contract model includes contract metadata and represents the contract as data via a single contract object related to one or more contract documents generated by a document generation software, wherein a contract document includes identifier properties, text content, tables, schedules or appendices and the template has a document identifier, a number of documents section identifiers, a structured data identifier and or one or more logic identifiers and or one or more candidate edit identifiers, one or more editable input fields capable of being rendered in a graphical user interface and one or more automatically calculated fields, the template representing at least a portion of the electronic contract;

obtaining, from a digital data storage, model description data and a plurality of answer values, the model description data describing the contract model;

based on the model description data and the plurality of answer values, creating and storing in computer memory a graph including a graph data representation of the plurality of answer values and variables that are required in a body of the contract document, wherein nodes of the graph represent the plurality of answer values and the variables, and edges of the graph represent derivations, calculations, or dependencies;

based on the update to the attribute of the contract model, identifying and removing, from the graph data representation, one or more edges that are directed from derived or calculated first variables to second variables that the first variables had been declared as using;

based on the update to the attribute of the contract model, identifying and removing, from the graph data representation, one or more nodes corresponding respectively to one or more variables that are not directly referenceable by the contract document after the update to automatically update the digitally stored contract model of the electronic contract, wherein the contract metadata is updated corresponding to the removing of the one or more edges and the one or more nodes, wherein the updated contract metadata is copied into a JavaScript Object Notation (JSON) model, and wherein a check-in summary is provided to summarize the update of the digitally stored contract model as a part of a document editing session;

updating a status of the electronic contract throughout a lifecycle of the document editing session of the electronic contract, wherein one or more prevailing contract terms of the electronic contract are tracked and displayed during the lifecycle.

9. The electronic device of claim 8, the one or more non-transitory computer-readable storage media further comprising sequences of stored program instructions which, when executed using the one or more processors, cause the one or more processors to mark the edges that are removed as deflated.

10. The electronic device of claim 8, the one or more non-transitory computer-readable storage media further comprising sequences of stored program instructions which, when executed using the one or more processors, cause the one or more processors to execute the instructions to create the plurality of answer values based upon an input received via an interactive interview.

11. The electronic device of claim 8, the one or more non-transitory computer-readable storage media further comprising sequences of stored program instructions which, when executed using the one or more processors, cause the one or more processors to calculate one or more automatically calculated fields of a data record based on the one or more editable input fields.

12. The electronic device of claim 11, the one or more non-transitory computer-readable storage media further comprising sequences of stored program instructions which, when executed using the one or more processors, cause the one or more processors to, in response to identifying and removing the one or more nodes corresponding respectively to the one or more variables that are not directly referenceable by the contract document after the update, flag one or more areas of the data record with reset-answer flags to prompt the one or more areas of the data record to be re-asked in subsequent updates to the contract document.

13. The electronic device of claim 8, the one or more non-transitory computer-readable storage media further comprising sequences of stored program instructions which, when executed using the one or more processors, cause the one or more processors to execute, in response to identifying and removing, from the graph data representation, the one or more edges that are directed from the derived or calculated first variables to the second variables that the first variables had been declared as using, generating a deflated-record flag indicating the one or more edges have been deflated.

14. The electronic device of claim 8, the graph data representation of the plurality of answer values and variables that are required in the electronic contract comprising one or more phrases of the electronic contract linked one-to-many times with the attributes and contract objects.

15. One or more non-transitory computer-readable storage media storing one or more sequences of stored program instructions which, when executed using one or more processors, cause the one or more processors to automatically update an object-based digitally stored multi-tier contract model of an electronic contract in response to changes in data values upon which the model is based and connected to other electronic contracts via a series of rules, by executing:
   using a server computer system, receiving an update to an attribute of the digitally stored contract model, the contract model having been created based on a digitally stored template that includes a drafting platform with a set of drafting rules and object-oriented programming, wherein the contract model includes contract metadata and represents the contract as data via a single contract object related to one or more contract documents generated by a document generation software, wherein a contract document includes identifier properties, text content, tables, schedules or appendices and the template has a document identifier, a number of documents section identifiers, a structured data identifier and or one or more logic identifiers and or one or more candidate edit identifiers, one or more editable input fields capable of being rendered in a graphical user interface and one or more automatically calculated fields, the template representing at least a portion of the electronic contract;
   obtaining, from a digital data storage, model description data and a plurality of answer values, the model description data describing the contract model;
   based on the model description data and the plurality of answer values, creating and storing in computer memory a graph including a graph data representation of the plurality of answer values and variables that are required in a body of the contract document, wherein nodes of the graph represent the plurality of answer values and the variables, and edges of the graph represent derivations, calculations, or dependencies;
   based on the update to the attribute of the contract model, identifying and removing, from the graph data representation, one or more edges that are directed from derived or calculated first variables to second variables that the first variables had been declared as using;
   based on the update to the attribute of the contract model, identifying and removing, from the graph data representation, one or more nodes corresponding respectively to one or more variables that are not directly referenceable by the contract document after the update to automatically update the digitally stored contract model of the electronic contract, wherein the contract metadata is updated corresponding to the removing of the one or more edges and the one or more nodes, wherein the updated contract metadata is copied into a JavaScript Object Notation (JSON) model, and wherein a check-in summary is provided to summarize the update of the digitally stored contract model as a part of a document editing session;
   updating a status of the electronic contract throughout a lifecycle of the document editing session of the electronic contract, wherein one or more prevailing contract terms of the electronic contract are tracked and displayed during the lifecycle.

16. The media of claim 15, further comprising sequences of stored program instructions which, when executed using one or more processors, cause the one or more processors to mark the edges that are removed as deflated.

17. The media of claim 15, further comprising sequences of stored program instructions which, when executed using one or more processors, cause the one or more processors to create the plurality of answer values based upon an input received via an interactive interview.

18. The media of claim 15, further comprising sequences of stored program instructions which, when executed using one or more processors, cause the one or more processors to calculate the one or more automatically calculated fields of a data record based on the one or more editable input fields.

19. The media of claim 18, further comprising sequences of stored program instructions which, when executed using one or more processors, cause the one or more processors to execute, in response to identifying and removing the one or more nodes corresponding respectively to the one or more variables that are not directly referenceable by the contract document after the update, flag one or more areas of the data record with reset-answer flags to prompt the one or more areas of the data record to be re-asked in subsequent updates to the contract document.

20. The media of claim 15, further comprising sequences of stored program instructions which, when executed using one or more processors, cause the one or more processors to execute, in response to identifying and removing, from the graph data representation, the one or more edges that are directed from the derived or calculated first variables to the second variables that the first variables had been declared as using, generating a deflated-record flag indicating the one or more edges have been deflated.

* * * * *